UNITED STATES PATENT OFFICE.

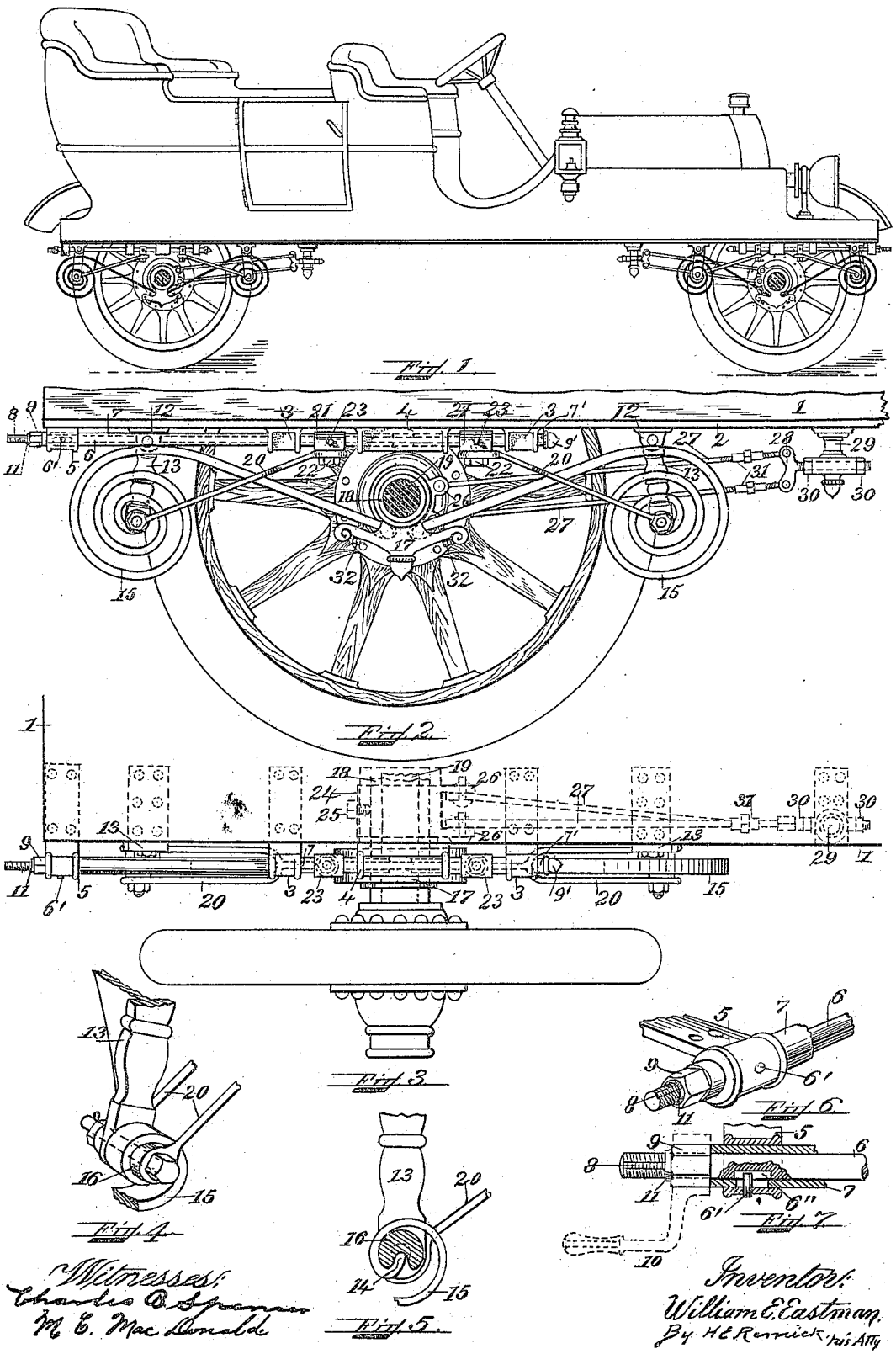
W. E. EASTMAN.
VEHICLE SPRING.
APPLICATION FILED FEB. 1, 1909.
962,557.
Patented June 28, 1910.

WILLIAM E. EASTMAN, OF BOSTON, MASSACHUSETTS.

VEHICLE-SPRING.

962,557.

Specification of Letters Patent.   Patented June 28, 1910.

Application filed February 1, 1909. Serial No. 475,500.

*To all whom it may concern:*

Be it known that I, WILLIAM E. EASTMAN, a citizen of the United States, and a resident of Boston, in the county of Suffolk and State of Massachusetts, have invented certain new and useful Improvements in Vehicle-Springs, of which the following is a specification.

My invention relates to improvements in springs for vehicles and it pertains to the class that support the carriage body above the axles, and for the purpose of illustration I adapt my invention to the automobile.

The objects of my improvement are, first, to provide means to govern the tension of said springs to accord with the lesser or greater weight to be supported thereon; second, to increase the leverage to secure uniformity in the tension of the springs; third, to impart an increased vertical and lateral force to said springs after they are depressed to a predetermined limit; fourth, to prevent the semi-rotation of the carriage axle casing; fifth, to reduce the vibration of the vehicle to a minimum independently of the weight to be carried, and in other essentials hereinafter described. I attain these objects by the mechanism illustrated in the accompanying drawing, wherein:

Figure 1 is a side elevation of a vehicle with the axles in section and the near wheels removed to display my organized invention. Fig. 2, illustrates the rear portion with identical features on an enlarged scale. Fig. 3, denotes a plan of the same. Fig. 4, is a detail of the bracket and rods supporting the spring. Fig. 5, shows the manner of anchoring the spiral spring to said bracket. Fig. 6, is a perspective of the bracket supporting the adjusting rods, casings and accessories, and Fig. 7, a longitudinal section of the same.

Corresponding numerals of reference identify similar features throughout the drawing, referring to which—

1, designates the vehicle, and 2 the angle iron to which the supporting brackets 3—3 and 4 are secured. 5 is a bracket similarly attached and sustaining the outward end of the adjusting rod 6 provided with a lengthwise slot 6″ which receives the pin 6′ passing through a similar slot (Fig. 7) in the two-part sleeve 7 7′, said pin being driven through and sustained by the bracket 5 as shown, thus obviating the longitudinal and rotational movement of the rods. Said sleeve comprises members 7—7′ overriding said adjusting rod 6, which members are actuated in opposite directions by the rotation of the nut 9 contacting the end of the sleeve 7 (Fig. 6) protruding through the bracket 5, and in a like manner the headed end 9′ of said rod contacting and actuating the second sleeve 7′, but a slight resultant movement being necessary to secure the responsive action of the springs. Said rod 6, at its inward end is supported by the bracket 3 and at its outer end is screw-threaded and provided with a scale 8 over which the nut 9 turns when manually rotated by the crank 10 to simultaneously actuate both sleeves 7—7′ toward or away from the axle 18, any movement being accurately gaged through the co-action of the index ring 11 integral with the nut 9, and the scale 8. If desired, said scale may bear numbers at certain intervals to note the pre-determined loads the springs will sustain, thus facilitating their quick adjustment.

The fixed brackets 12 swingingly support the pendent vibratory links 13 which sustain the ends 14 of the spiral springs 15 (Fig. 5.) anchored in the grooved stud blocks 16. The inner ends of said springs constituting extensions are movably pocketed rearwardly and forwardly in duplicate depressions in the saddle piece 17 (Fig. 2.) suspended by, and embracing the sleeve 18 loose on the axle 19. To increase or diminish the tension of said springs, I provide the connecting rods 20, diagonally positioned in their relation to the horizontal plane of the adjusting rods 6; the lower bifurcated arms of said rods 20 are attached to said links 13 as shown (Fig. 4.) the upper arm being secured to the bracket 21 by the nut and bolt 22, the screws 23 confining the brackets to the sleeves 7 and 7′ and by which said sleeves are horizontally actuated by the nut 9 in conjunction with the head 9′ as previously described to increase or lessen the tension of the springs 15. A further means of final adjustment of this tension is through the extensions and the screw bolts 32 in the saddle 17 to secure a uniform action in the spring aggroupment.

Secured to the sleeve 18, I provide the collar 24 confined to the said sleeve by the stud-bolt 25 (Fig. 3.) and having lugs 26 projecting diagonally from the side adjacent to the center of the vehicle; to these lugs are attached the radial rods 27 leading to the screw threaded tee-bolt 28 and attached thereto. Said bolt is confined in the anchorage 29 secured to the angle iron 2, and adjusted therein by the check-nut 30; a temporary adjustment may also be effected by the turn-buckles 31. Said rods prevent the axles from moving horizontally and thereby obviate friction.

The operation of my improved vehicle spring is as follows: Assuming the carriage to stand in its normal condition i. e. without a burden, if now, a weight of a few hundred pounds be added the body will settle to a position that will insure comfortable riding through a proper resilience of the springs.

Should the weight be increased to several hundred pounds, manifestly the resilience would be impaired; this effect being anticipated, the operator restores the recuperative power of said springs by the rotation of the nut 9, impelling the rearward and forward sleeves 7—7' toward the axle and with them the connecting rods 20, thus forcing the links 13 to a position that will increase and restore the original tension of the springs to support the body with its former elasticity. In a like manner, the reversal of this operation with a depleted load permits the springs to return to their normal capacity. Summarily, the leverage is increased to correspond with the increased tension of the springs. I will observe that the depression of the carriage body also imparts a combined vertical and lateral thrust to the springs which enhances the ridable qualities of the vehicle over rough roads or obstacles, and, as there may be other methods of producing the results herein described, for instance replacing the manually actuated threaded nut with a rack and pinion operated from the engine with suitable disconnecting levers, if a power driven carriage, or by pneumatic appliances utilizing the additional weight over the normal capacity of the springs to operate my devices, or other actuating mechanical appliances, I prefer substantially the manner illustrated, and while I do not limit myself to the details of construction herein described, I may variously modify the same while adhering to the spirit of my invention which having described—

I claim:

1. The combination of a spiral and compensating member or extension adapted to support a carriage body elastically, said spiral upheld by the vehicle and said member upheld by the axle and anchored by movable joints, said extension adapted as a lever to compensate the tension of the spiral, means to adjust said spiral to the weight imposed and means to restrict the movement of the axle.

2. The herein described mechanical devices constituting springs for vehicles comprising adjustable rods, sleeves containing said rods, bearings to support said sleeves and permit their horizontal movement, connecting rods and means securing said rods to said sleeves, and spiral springs actuated by said connecting rods to increase and decrease their tensional strength in proportion to the weight to be supported.

3. Springs for vehicles arranged to operate with a compensating leverage comprising saddles movably pocketing the contiguous ends of the springs, means in said saddles to control said leverage stud blocks anchoring the spiral ends of said springs, vibratory means sustaining said blocks, two-part sleeves confined to move horizontally and adapted to increase or diminish the tension of the springs, means connecting said blocks with said sleeves and means to govern the movement of the sleeves to impart a resisting quality to said springs additional to their normal capacity to uphold.

4. An elastic support for vehicles combining a vertical and a lateral sustaining power to the carriage body comprising adjusting rods having adjacent to their outer ends a reëntering slot, sleeves enveloping said rods and provided with a corresponding slot, fixed brackets supporting said sleeves and provided with co-acting means to permit the longitudinal movement of the sleeves and to restrict the rotation of said rods, in combination with springs having a spiral at one end, terminating in extensions vibratory means suspending said spirals from the vehicle, bifurcated rods connecting said springs with the sleeves and means supporting the extensions of the said springs contiguous to the axle casings.

5. Springs for carriages combining an elastic support and a compensating lever, vibratory means for their attachment to the carriage, sleeves surrounding the axles and provided with means loosely supporting said springs thereto, rods governing the tension of said springs, means to actuate said rods, and means communicating from the carriage body to the axle sleeves to reduce the motion of the axles horizontally.

6. A carriage supporting spring arranged and adapted to have its leverage increased to govern its tension comprising a spiral terminating in an extended member, means for its attachment to the vehicle body and to the axle, an adjusting rod, communicating means from said spiral to said rod to increase and diminish the tension of the spiral and means to regulate the movement of the adjusting rod.

7. In an elastic support for vehicles the following instrumentalities, adjusting rods adapted to be longitudinally actuated, sleeves enveloping said rods and means defining the rods' displacement, springs coiled at the ends remote from the axles and having extensions, means suspended by said axles to receive the adjacent extensions of the springs, rods restraining the movement of the axles and rods connecting said spring coils with the sleeves to impart thereto a divergent and convergent motion to relax or tighten the said coils whereby the power of the organized device increases in a ratio corresponding with the tension of the springs.

8. The combination with a vehicle of a two-part sleeve suspended therefrom, a rod embraced by said sleeve and having an external screw thread at one end, a scale extending the length of said thread, an internally screw threaded nut provided integrally with an index ring, a geometrical spiral spring and means connecting the rod with the said spring in a manner that any longitudinal movement of the rod will increase and diminish the tension of the spring as set forth.

9. An elastic support for vehicles comprising in duplicate vibratory links, connecting rods controlling said links, means to actuate said rods horizontally, spiral springs attached to said links and saddles loosely suspended from sleeves over the axles in a manner to reciprocate the lateral thrust of said springs.

10. In an elastic support for vehicles a saddle piece having rearward and forward duplicate depressions supporting the inner ends of the springs, means therein to adjust the tension of said spring ends and a sleeve loosely surrounding the axle casing, in combination therewith a sleeve adapted to be secured to the axle casing provided with duplicate lugs, radial rods attached thereto and means for anchoring and governing the tension of said rods.

In testimony whereof I have affixed my signature, in presence of two witnesses.

WILLIAM E. EASTMAN.

Witnesses:
CHARLES B. SPENCER,
M. C. MACDONALD.